United States Patent [19]

Torkelson et al.

[11] Patent Number: 5,440,875
[45] Date of Patent: Aug. 15, 1995

[54] FIXED GEOMETRY MIXER/EJECTOR SUPPRESSION SYSTEM FOR TURBOFAN AIRCRAFT ENGINES

[75] Inventors: Delbert W. Torkelson, Catoosa; Thomas J. Jannetta, Tulsa, both of Okla.; John P. Nikkanen, West Hartford, Conn.; Daniel E. Webb, Wethersfield, Conn.; Steven H. Zysman, Middletown, Conn.; William D. Colletti, Cromwell, Conn.; Alfred M. Stern, Manchester, Conn.; Wesley K. Lord, Glastonbury, Conn.

[73] Assignees: United Technologies Corporation, East Hartford, Conn.; Nordam, Tulsa, Okla.

[21] Appl. No.: 360,174

[22] Filed: Dec. 20, 1994

Related U.S. Application Data

[63] Continuation of Ser. No. 82,612, Jun. 25, 1993.

[51] Int. Cl.⁶ ............................................. F02K 3/02
[52] U.S. Cl. ................................. 60/226.1; 60/264; 60/271; 239/265.17
[58] Field of Search ................. 60/262, 264, 226.1, 60/271; 181/213, 220, 222; 239/265.13, 265.17

[56] References Cited

U.S. PATENT DOCUMENTS

| | | | |
|---|---|---|---|
| 3,696,617 | 10/1972 | Ellis . | |
| 3,710,890 | 1/1973 | True et al. | 181/33 |
| 4,077,206 | 3/1978 | Ayyagari | 60/262 |
| 4,117,671 | 10/1978 | Neal et al. | 60/262 |
| 4,501,393 | 2/1985 | Klees et al. | 239/265 |
| 4,835,961 | 6/1989 | Presz, Jr. et al. | 60/264 |
| 4,909,346 | 3/1990 | Torkelson | 181/213 |
| 5,060,471 | 10/1991 | Torkelson | 60/262 |
| 5,127,602 | 7/1992 | Batey et al. | 244/1 |
| 5,157,916 | 10/1992 | Wynosky et al. | 60/264 |
| 5,167,118 | 12/1992 | Torkelson | 60/226 |

FOREIGN PATENT DOCUMENTS 0244336 11/1987 European Pat. Off. .
2085088 11/1984 United Kingdom .

*Primary Examiner*—Timothy S. Thorpe
*Attorney, Agent, or Firm*—Head & Johnson

[57] ABSTRACT

An internal flow mixer is attached to the rearward end of a turbofan engine for inverting the engine fan and core streams. Rearwardly of the internal flow mixer is a multi-lobed exhaust nozzle which mixes ambient air with the gases flowing from the flow mixer. An ejector housing lined with acoustic absorption material receives the flow from the exhaust nozzle and discharges the thrust producing gases in noise abatement condition.

11 Claims, 5 Drawing Sheets

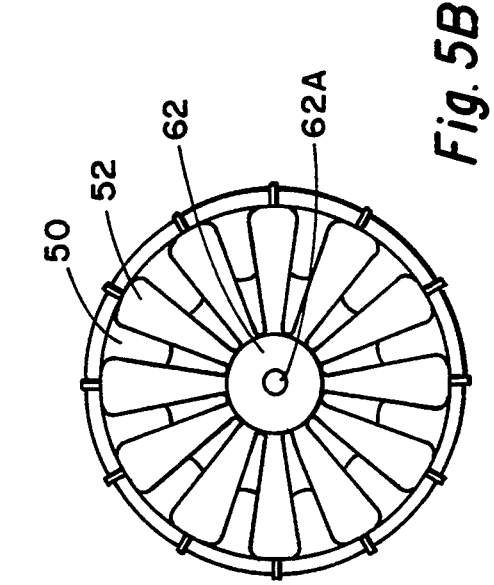
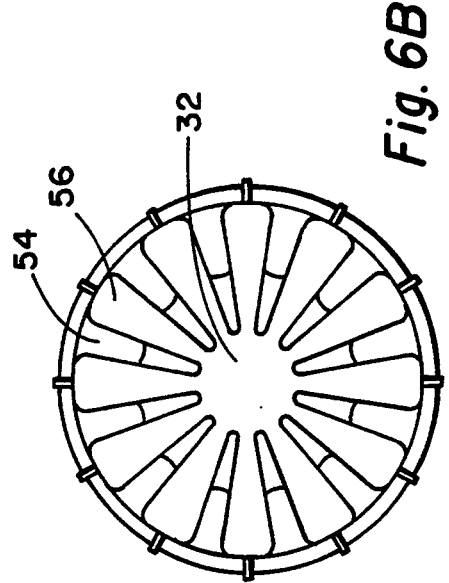
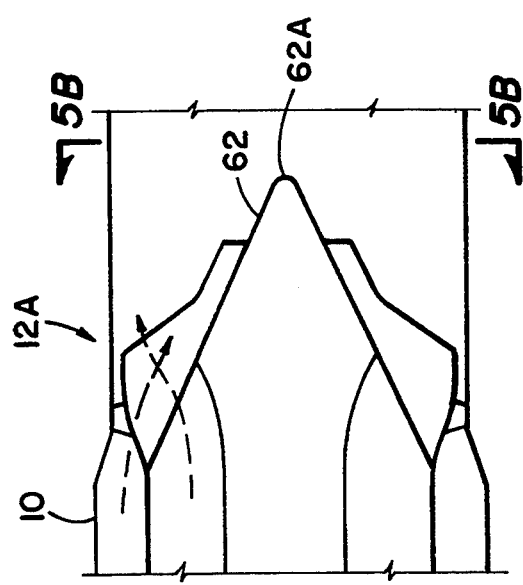
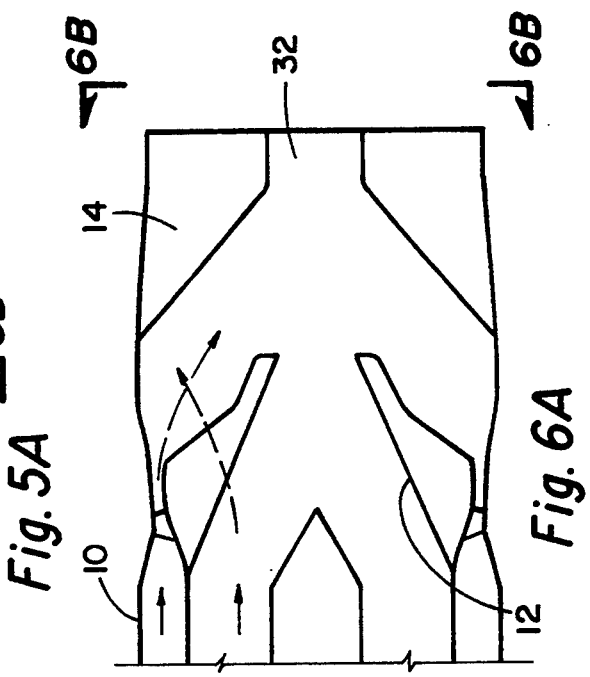
Fig. 5B
Fig. 6B
Fig. 5A
Fig. 6A

FIXED GEOMETRY MIXER/EJECTOR SUPPRESSION SYSTEM FOR TURBOFAN AIRCRAFT ENGINES

This is a continuation of application Ser. No. 08/082,612 filed on Jun. 25, 1993, now abandoned.

BACKGROUND OF THE INVENTION

Noise generated by aircraft jet engines during takeoff and landing is a matter of serious concern in most metropolitan areas of the world. In the United States alone, approximately five million people live or work adjacent to airports and are affected significantly by aircraft noise. Many municipalities have taken action to require reduction in aircraft noise. Much work has been done on designing turbofan aircraft engines to reduce noise levels. For background information relating to noise reduction systems for jet engines, reference may be had to the following U.S. Pat. Nos. 3,710,890; 4,077,206; 4,117,671; 4,501,393; 4,909,346; 5,060,471; 5,127,602 and 5,167,118. These patents are incorporated herein by reference.

It generally can be said that in turbofan jet aircraft engines, the engine airflow is split into two parts as it passes through the engine, i.e. the primary or core flow and the fan or bypass flow. The primary or core flow passes through the low pressure and high pressure compressors and into the combustion chamber where fuel is mixed with the high pressure air and burned. The core flow then passes through the high and low pressure turbines and into the exhaust duct. The fan or bypass air flow only passes through the fan and is routed around the core engine and into the exhaust duct. In low bypass ratio confluent turbofan nacelles, the two flows enter into the exhaust duct at approximately equal pressure but at much different temperatures (approximately 230° F. for the bypass flow and approximately 1100° F. for the core flow). Unless mixed, the two flows remain substantially separate as they exhaust through the tailpipe of the jet engine. The hot core flow exits the engine at very high velocity which is much greater than the velocity of the fan gas. This hot core gas generates a large part of the engine jet noise.

One apparatus which has been developed and which has achieved beneficial results in the noise reduction of turbofan aircraft engines is the flow mixer of the multi-channel or multi-lobe inverted flow type. Examples of use of such mixers for noise suppression are found in the previously referenced U.S. Pat. Nos. 4,117,671 and 4,077,206. These flow mixers mix the two gas flows to more or less cause all the gas flowing through the tailpipe to flow at the same velocity. These flow mixers have been credited with noise reduction in the range of 3.5 to 4.5 decibels (Db) in the Effective Perceived Noise Level (EPNL), depending upon the engine cycle and bypass ratio. While this noise reduction is helpful, it is not sufficient within itself to solve all of the low bypass turbofan engine noise problems, and for this reason the exhaust flow mixer has had a limited commercial application.

To obtain larger magnitudes of noise reduction in jet engines, a traditional approach has been to mix ambient air flow with the jet engine flow to reduce jet velocity and associated noise. (Attention is called to U.S. Pat. Nos. 3,710,890 supra.) In order to provide large noise reduction, large ejector inlets with high secondary air flows have been used which have resulted in unacceptable levels of net thrust loss at cruise speeds.

The present disclosure provides a fixed geometry noise suppression system using ambient air flow in a manner that substantially eliminates the thrust sacrifices experienced with previous designs.

SUMMARY OF THE INVENTION

The present disclosure utilizes the benefits of an exhaust flow mixer design in combination with a multi-lobed nozzle and acoustically treated ejector assembly to substantially reduce the noise level of a turbofan engine with minimal impact on engine performance.

The present preferred embodiment is directed toward a low bypass turbofan engine which typically at its exhaust end has both fan and core exhaust air flows arranged concentrically and exiting the engine along the longitudinal axis. The noise suppressor system of this invention in a preferred embodiment includes: (a) a multi-lobed flow mixer attached to the aft end of the engine; (b) a multi-lobed exhaust nozzle supported from the aft end of the engine and aft of the flow mixer; (c) a cylindrical ejector shroud supported concentrically around the exit of the exhaust nozzle; and (d) an acoustic liner in said shroud.

In the preferred embodiment the lobed flow mixer has, as an example, twelve separate lobes and is attached to the aft end of the engine and directs the core and exhaust flows in opposite radial directions to invert the two exhaust streams. By moving the hot core flow to the outer portion of the lobed exhaust nozzle, cold ambient air mixes with the core flow to produce a mixed stream with lower velocity and temperature. The lobed exhaust nozzle extends aft of the flow mixer. The exhaust nozzle has an equal number of lobes as the flow mixer and the lobes of the two are arranged in alignment with each other. The exit center area of the lobed flow mixer and the entire area of the lobed exhaust nozzle are, in one embodiment, open with the engine center body extending within a few inches of the rearmost part of the lobed flow mixer. By having no center body there is a weight and size savings. The exhaust shroud extends aft of the exit of the lobed exhaust nozzle preferably for a distance equal to about 1.5 diameters of the inside of the shroud. The internal surface of the exhaust shroud is lined with acoustically treated material tuned to absorb noise emanating from the mixer/nozzle combination. The ejector shroud receives ambient or outside air and entrains it. This ambient air enters the forward end of the ejector through a carefully sized and contoured ejector inlet which is designed for maximum aerodynamic efficiency at aircraft cruise speed while at the same time exhibiting excellent low speed characteristics. Entrained ambient air flow is mixed with the engine air flow (both core and fan) inside the ejector shroud by the lobed exhaust nozzle. As a result, the mixed gas flow exits the ejector at greatly reduced velocity and associated noise level. Acceptable thrust levels are maintained by increase in total gas flow which compensates for the reduced exit velocity.

It is one object of this invention to provide a noise suppressor having a lobed flow mixer and a lobed exhaust nozzle with an equal number of lobes which are aligned with each other to divide the engine flow into multiple jet streams of reduced size and higher acoustic frequency.

Other objects and a better understanding of the invention can be had from the following description taken in conjunction with the drawings.

DESCRIPTION OF THE DRAWINGS

FIG. 5A is an elevational cross-sectional diagrammatic view of an alternate embodiment of the internal flow mixer and may be contrasted with the flow mixer design of FIG. 3A.

FIG. 5B is an end view of the alternate design of the internal flow mixer of FIG. 5A looking toward the aircraft engine, taken along the line 5B—5B of FIG. 5A.

FIG. 6A is an elevational cross-sectional diagrammatic view of the combination internal flow mixer and exhaust nozzle in the arrangement as shown in the forward portion of FIG. 2 but showing an alternate embodiment in which the exhaust nozzle employs deeper lobes to allow for increased noise reduction with minimum impact on thrust performance.

FIG. 6B is an end view of the exhaust nozzle looking toward the aircraft engine as taken along the line 6B—6B of FIG. 6A.

DESCRIPTION OF THE PREFERRED EMBODIMENTS

Figure 1:
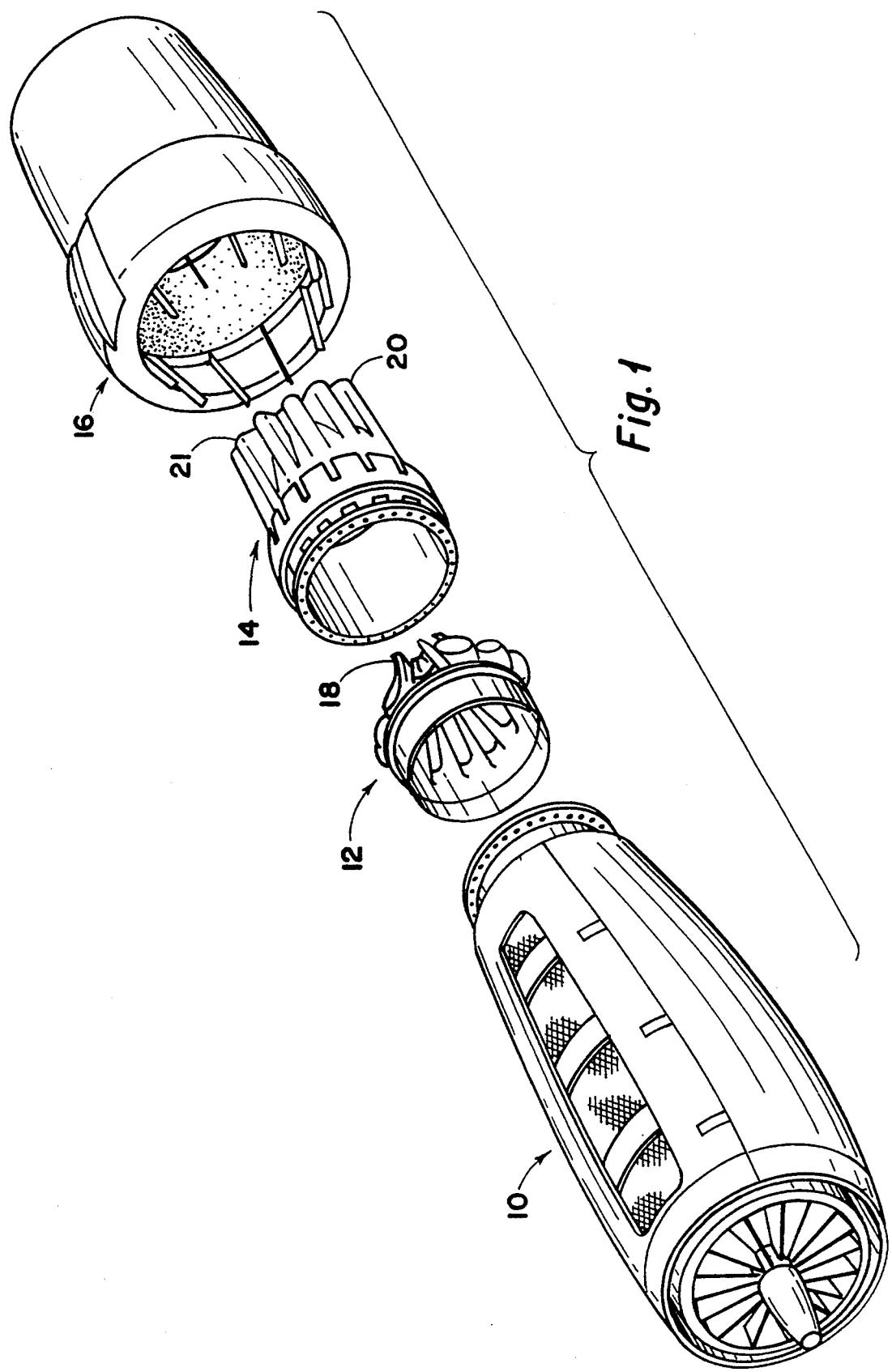
FIG. 1 is an exploded view showing the engine, internal lobed flow mixer, lobed exhaust nozzle, and ejector assembly shroud.

Reference is first made to FIG. 1 which shows the main components of this invention in exploded form for ease of identification. Shown thereon is a turbofan engine 10, an internal flow mixer 12 having rearwardly extending lobes 18, an exhaust nozzle assembly 14 having rearwardly extending lobes 20 and an ejector assembly 16.

Figure 2:
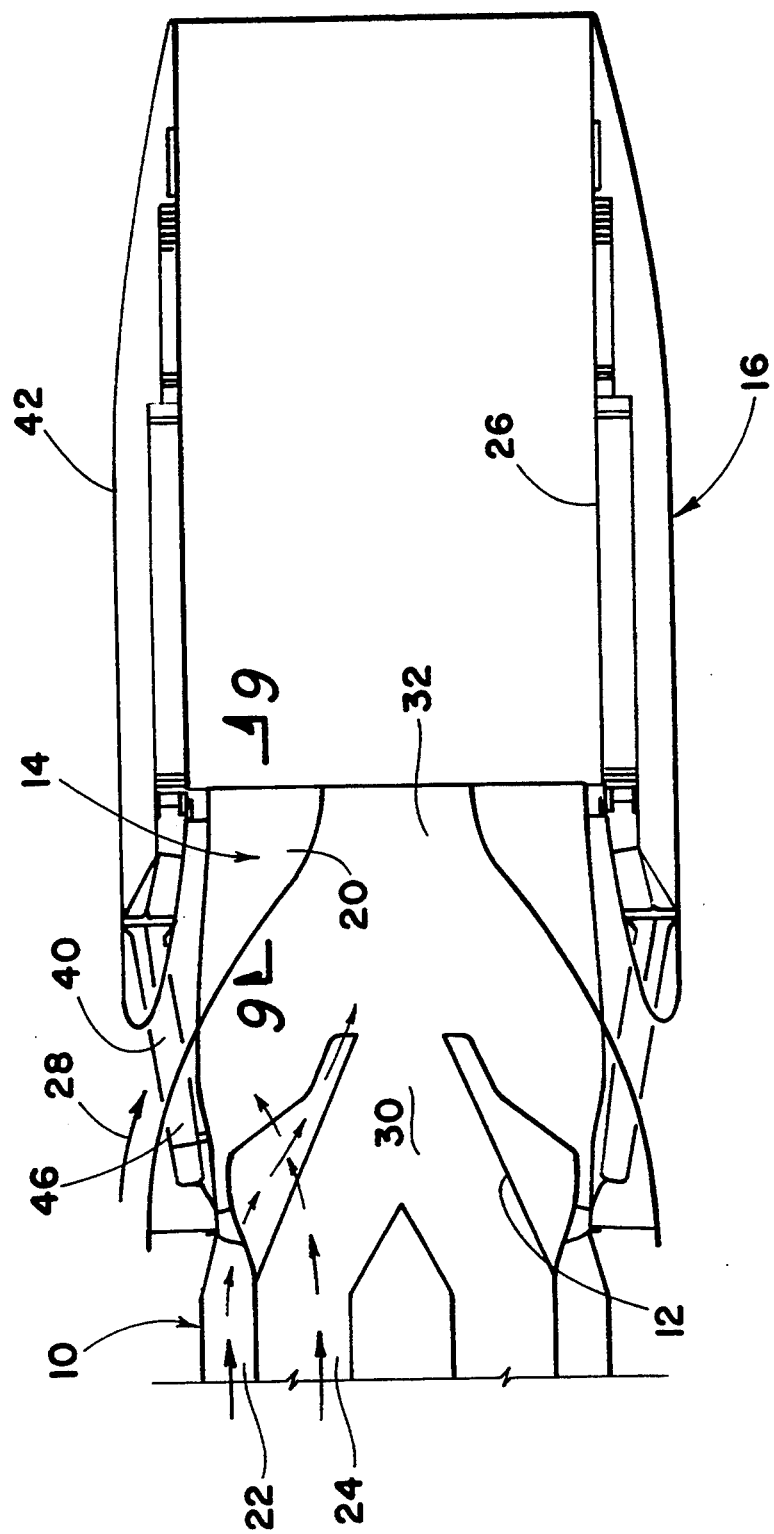
FIG. 2 is a schematic view showing the assembled relationship of the components of FIG. 1.

For a detailed description of a lobed flow mixer and how it functions, see U.S. Pat. No. 5,127,602 which is incorporated herein by reference. Attention is now directed to FIG. 2 which shows in simplified schematic form the components of FIG. 1 placed in assembled position. Internal flow mixer 12 is attached to the aft end 12A of engine 10. Flow mixer 12 is positioned to invert the fan flow 22 and the core flow 24. The aft end 12B of the lobes of the flow mixer is of smaller diameter than the forward end thereof. This flow mixer 12, for example, may be similar to the flow mixer described in U.S. Pat. No. 5,167,118 issued Dec. 1, 1992 to Delbert W. Torkelson, but with a preferred number of lobes (twelve) as taught herein.

Also attached to the rear of engine 10 and extending aft of internal flow mixer 12 is a lobed exhaust nozzle 14 having a forward end 14A. Exhaust nozzle 14 has an equal number of lobes (twelve preferred) as flow mixer 12. The lobes of the mixer and lobes of the exhaust nozzle are aligned. The lobes of the exhaust nozzle are larger at the forward end than at the aft end. The center space 32 of the lobed exhaust nozzle 14, like the lobed flow mixer 12, is open and allows free flow of exhaust gases to minimize losses, resulting in weight and size savings that are of most importance to commercial aircraft operators. In addition, flow mixer 12 in conjunction with lobed exhaust nozzle 14 results in more rapid mixing and accelerated internal noise generation mechanisms at relatively high frequencies. It is known that higher frequencies are more easily attenuated by the acoustically treated shroud than are lower frequencies. Furthermore, rapid mixing and attendant noise generation internal to the ejector assembly 16 will also render the acoustic treatment 26 more effective. The forward end 14A of exhaust nozzle 14 extends forwardly of the aft end 12A of flow mixer 12 so that the flow mixer 12 and the exhaust nozzle 14 are in overlapping, telescopic relationship to each other.

The ejector assembly 16 is provided with a generally cylindrical shroud 42. Shroud 42 is supported concentrically around the exit of the lobed exhaust nozzle 14 by struts 46 attached to and extending from the forward end of the nozzle. The interior of shroud 42 is lined with acoustically treated material tuned to absorb noise emanating from flow mixer 12 and exhaust nozzle 14 combination. For a description of suitable exhaust acoustical linings, attention is directed to U.S. Pat. No. 5,167,118. The ejector shroud extends aft of nozzle 14 exit a distance equal to about 1.5 shroud internal diameters to allow for mixing of the ambient and engine air inside the shroud. Inlet 40 is provided at the forward end of shroud 42 to provide for the entrance of outside air and is optimized aerodynamically using known engineering principles to provide for efficient capture of entrained free stream or ambient air. The entrained ambient air, indicated by arrow 28, flows through inlet 40 and is mixed with the output from flow mixer 12 by mixer external nozzle 14 aft of mixer 12 exit. As a result, the mixed gas flow from nozzle 14 exits the ejector assembly 16 at greatly reduced velocity and associated noise level. Since net thrust produced by the system is related to the product of total gas flow times exit velocity, acceptable thrust levels are maintained by the increase in total gas flow even though the exit velocity is reduced.

In order to cool the engine air to a level to substantially reduce noise as the exhaust gases exit from the ejector assembly, it is necessary to capture a large amount of ambient air for passage through inlet 40. If the inlet design employed to capture ambient air and bring it into the exhaust nozzle 14 is not carefully designed, efficiency penalties at aircraft cruise speeds are incurred. It is important that the ambient inlet design incorporates proper shaping and area distribution to provide high efficiency for noise suppressor ejector inlet at aircraft air speeds.

Figure 3B:
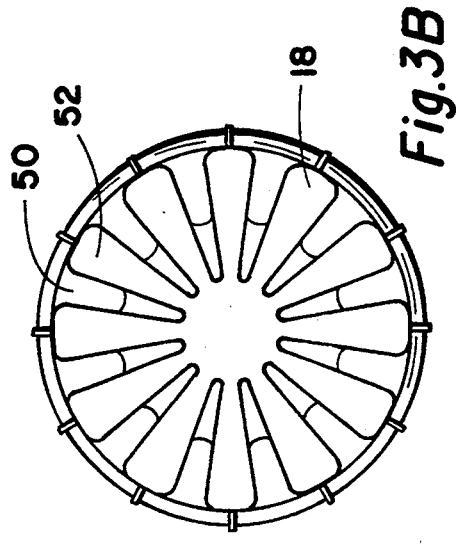
FIG. 3A is a schematic illustration of a flow mixer and FIG. 3B is a view looking forward toward the view of FIG. 3A.
Figure 4B:
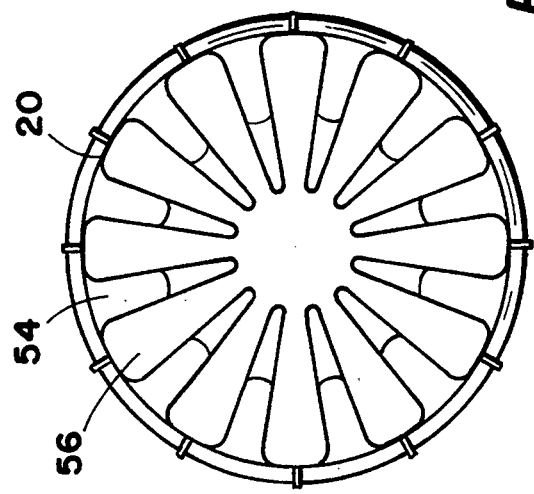
FIG. 4A is a schematic view of the lobed exhaust nozzle and FIG. 4B is a view looking forward toward the view of FIG. 4A.
Figure 3A:
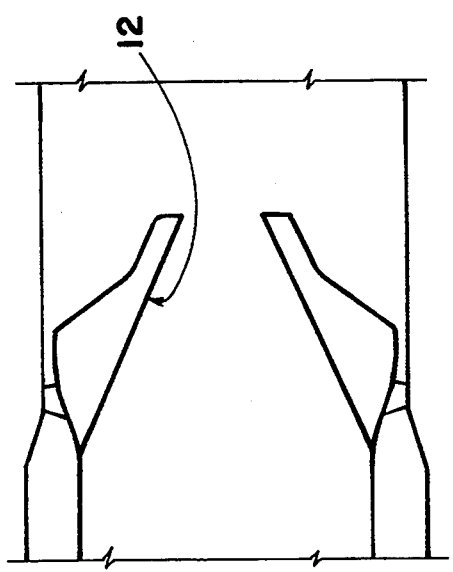
Figure 4A:
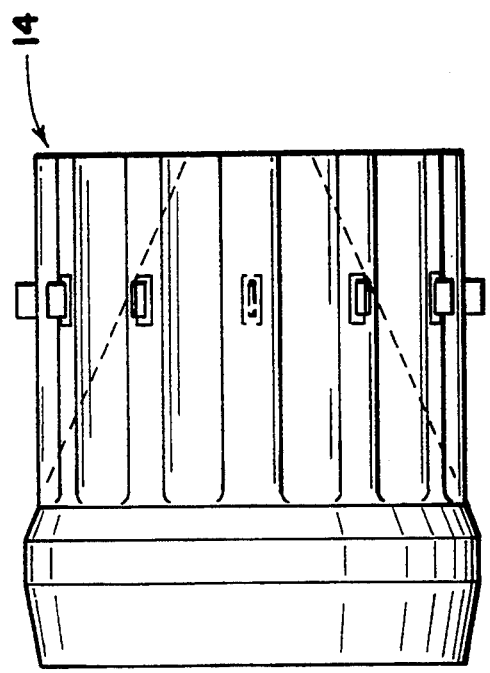

For a better understanding of flow mixer 12 and lobed exhaust nozzle 14, attention is directed to FIGS. 3A and 3B and to FIGS. 4A and 4B. FIGS. 3A and 3B do not show the centerbody. Shown in FIG. 3B are fan flow passage 50 and core flow passage 52. As seen in FIG. 3B, there are twelve lobes 18. FIG. 3B is a view looking forward toward the flow mixer shown in FIG. 3A. FIG. 4B is a view looking forward toward the schematic view of exhaust nozzle 14 shown in FIG. 4A. FIG. 4 shows a lobed exhaust nozzle of a different configuration than FIG. 2. Shown in FIG. 4B are ambient air flow passage 54 and outlet gases passage 56. Also shown are lobes 20. The lobes 20 of FIG. 4B are aligned with the lobes 18 of FIG. 3B. It has been found that the number of lobes is important. Although there is a range of ten to fifteen lobes which may be acceptable, the use of twelve lobes is preferred. This number of lobes achieves effective mixing while avoiding excessive loss of thrust. It has been found that a mixer nozzle having twenty lobes results in a one-half percent efficiency loss compared to a mixer nozzle having twelve lobes.

Flow mixer 12, exhaust nozzle 14, ejector 16 and ambient air inlet 40 are employed in a fixed geometry arrangement, that is, there are no moving parts. This fixed geometry arrangement attains increased reliability and decreased cost compared with dynamic sound reduction systems.

Referring to FIGS. 5A and 5B, an alternate design of internal flow mixer 12 is illustrated, the alternate design being generally indicated by the numeral 12A. As previously described, the function of the internal flow mixer is to invert fan flow and core flow from the turbofan engine to cool the hot gases of the core flow. In the embodiment of FIG. 2 internal flow mixer 12 has an open center 30. While internal flow mixer 12 directs core flow in an outwardly expanding direction by means of the lobed mixer, nevertheless, center 30 is open and a substantial portion of the core flow gas still passes through center 30 into the area of exhaust nozzle 14. In the arrangement of FIG. 5A the center of internal flow mixer 12A is closed by a conical member 62 that converges to a point 62A to thereby effectively reduce the possibility of core gas passing directly through the center of the mixer. This arrangement forces all of the core gas into the core flow passageways 52 formed by the lobed structure and thus outwardly to more effectively invert fan and core gases as these gases exit internal flow mixer 12A. The advantage of the alternate embodiment of FIGS. 5A and 5B is that the core flow and fan flow gases are more effectively inverted for cooling of the core flow and thereby more effective elimination of hot gases passing out the exhaust end of the ejector. A small level of thrust is sacrificed by the closure of the center portion of the lobed structure with conical portion 62.

FIGS. 6A and 6B show an additional alternate design. These figures show internal flow mixer 12 with the open center as in FIG. 2, but wherein exhaust nozzle 14 has deep lobes. These deep lobes provide a reduced dimensioned center space 32 as compared with the arrangement of FIG. 2. The deeper lobes achieve increased efficiency of mixture of the engine produced flow with the entrained ambient air for a more efficient cooling of the engine gases before exiting from the ejector assembly. The deep lobed exhaust nozzle of FIGS. 6A and 6B has a minimum negative impact on thrust performance.

Figure 7A:
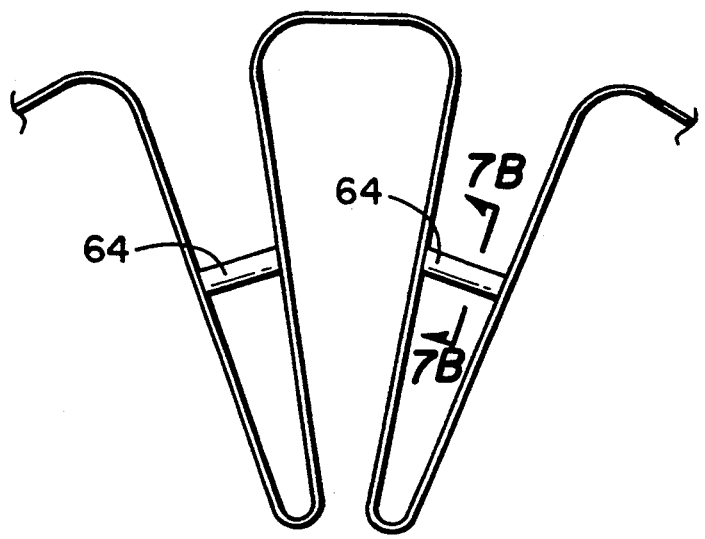
FIG. 7A is a fragmentary enlarged cross-sectional view of the exhaust nozzle as shown in FIGS. 4A and 4B and showing aerodynamic wall braces employed with the lobe nozzle to obtain improved stiffening of the nozzle sidewalls to thereby help diminish resonance noise tones.
Figure 7B:
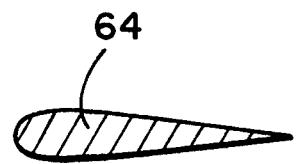
FIG. 7B is a cross-sectional view of a wall brace as taken along the line 7B—7B of FIG. 7A showing the preferred aerodynamic cross-sectional configuration of the brace.

Both internal flow mixer 12 and exhaust nozzle 14 utilize a lobed construction to achieve intermixing of gases of different temperatures. In order to provide maximum flow area within these structures, the lobes must be constructed of relatively thin metal. This type of construction means that the flow mixer and exhaust nozzle lobed portions have large flat panel portions forming the lobe walls. Due to the required relatively thin material, these panels can vibrate or resonate at low noise tones that result in unacceptably increased sound generation at various engine power settings. To reduce the possibility of resonant vibration the flat panel wall portions of the lobed flow mixer and/or exhaust nozzle, aerodynamic wall braces 64 are employed as seen in FIGS. 7A and 7B. Wall braces 64 are inserted between the lobed structure flat wall portions. Wall braces 64 serve to strengthen the lobed structure and to reduce the likelihood that the large flat wall surfaces will resonate and thereby generate sound. FIG. 7B is a cross-sectional view of one of the aerodynamic wall braces 64 showing its aerodynamic construction.

Figure 8A:
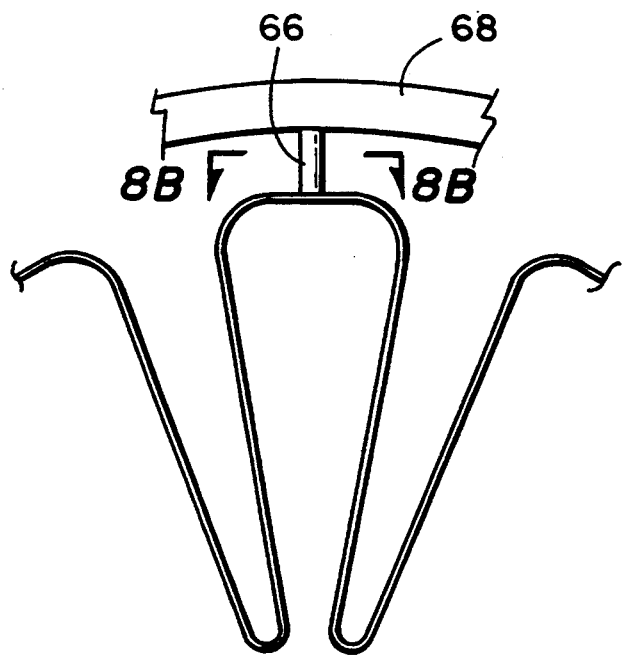
FIG. 8A is a fragmentary elevational view of the lobes of an exhaust nozzle and showing the use of air foil support struts to secure the nozzle to a nozzle support shroud. The use of struts provide rigid support and adjustability of the nozzle lobes with improved performance relative to the normally employed auxiliary strap.
Figure 8B:
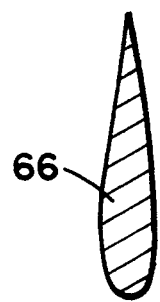
FIG. 8B is a cross-sectional view of one of the air foil support struts showing the preferred aerodynamic design thereof.

FIGS. 8A and 8B show improvements in the method of mounting the lobed portions of exhaust nozzle 14. As previously indicated, for maximum engine efficiency and minimum weight the lobed exhaust nozzle 14 is preferably formed of relatively thin metal. Thus, the nozzles with lobed exits have very little structural stiffness, and this is particularly so in the radial direction. Accordingly, they must be supported by an auxiliary strap which causes aerodynamic drag in the external flow path. To reduce this sacrifice in thrust, air foil shaped struts 66 are affixed to the outer perimeter of the nozzle lobes and support the nozzle lobes to an external ring 68 that is a part of the nozzle support shroud. Struts 66 provide rigid support and adjustability for the nozzle lobes without imposing significant aerodynamic drag as is occasioned when auxiliary straps are employed. FIG. 8B shows the aerodynamic shape of support struts 66.

Figure 9:
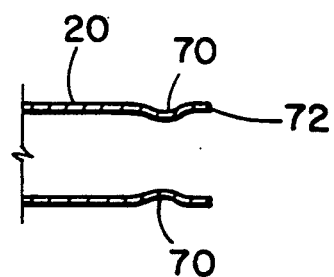
FIG. 9 is a cross-sectional view of one of the exhaust nozzle lobes taken along the line 9—9 of FIG. 2 illustrating how the lobes are shaped to add structural stiffness to the nozzle sidewalls.

FIG. 9, which is a cross-sectional view of one lobe of the exhaust nozzle 14 as taken along the line 9—9 of FIG. 2, shows a means of adding structural stiffness to the nozzle sidewalls.

By the use of the principles of this invention, the following features are obtained:

(a) internal flow mixer 12 inverts fan flow and core flow;

(b) lobed exhaust nozzle 14 (with an equal number of lobes as flow mixer 12 and with the two sets of lobes aligned) divides the engine flow into multiple jet streams of reduced sized and higher, and thus easier to attenuate, acoustic frequency;

(c) ejector shroud 42 that is lined with acoustic treatment material entrains free stream air and absorbing mixing noise;

(d) optimized aerodynamic inlet designed in accordance with aerodynamic principles provides for efficient capture of entrained ambient stream air from the outside of the engine;

(e) mixed air flow exits the ejector assembly in greater mass at reduced velocity and with substantially reduced noise levels and with minimum thrust loss.

(f) structural reinforced lobed portions of the mixer nozzle, accomplished by means of wall braces and/or radially extending struts, reduce vibrational resonance noise;

(g) the provision of a convergent-divergent section built into each lobe of the exhaust nozzle adjacent the exit end adds structural stiffness to the nozzle sidewalls; and (h) the combination of some or all of the features (a) through (g) above results in a synergistic system for suppression of turbofan aircraft engine noise.

The claims and the specification describe the invention presented and the terms that are employed in the claims draw their meaning from the use of such terms in the specification. The same terms employed in the prior art may be broader in meaning than specifically employed herein. Whenever there is a question between the broader definition of such terms used in the prior art and the more specific use of the terms herein, the more specific meaning is meant.

While the invention has been described with a certain degree of particularity, it is manifest that many changes may be made in the details of construction and the arrangement of components without departing from the spirit and scope of this disclosure. It is understood that the invention is not limited to the embodiments set forth herein for purposes of exemplification, but is to be limited only by the scope of the attached claim or claims, including the full range of equivalency to which each element thereof is entitled.

What is claimed is:

1. A noise suppression system for use with a turbofan engine having, at its exhaust end, fan flow and core flow streams, the suppression system comprising:

a flow mixer having an aft end and formed of a selected number of fixed wave-like lobes and attached to said exhaust end of said turbofan engine and configured to invert said fan flow and said core flow streams to provide a flow mixer outlet stream, an exhaust nozzle having a forward end and being formed of a selected number of fixed wave-like lobes supported aft of said flow mixer including means for the introduction of ambient air that is mixed with said flow mixer outlet stream, said exhaust nozzle forward end being forward of said flow mixer aft end so that said flow mixer is contained at least in part within said exhaust nozzle; and an exhaust shroud supported at least in part aft of said exhaust nozzle, said engine, said flow mixer, said exhaust nozzle and said exhaust shroud being arranged in sequential and at least substantially inline relationship.

2. A noise suppression system as defined in claim 1 in which said lobes of said flow mixer and said lobes of said exhaust nozzle are aligned and the number of lobes in each said flow mixer and said exhaust nozzle is the same.

3. A noise suppression system as defined in claim 1 in which there are twelve lobes in said flow mixer and twelve lobes in the exhaust nozzle and the lobes in said flow mixer and in said exhaust nozzle are aligned.

4. A noise suppression system as defined in claim 1 including inlet means in said exhaust shroud forward of said aft end of said exhaust nozzle providing said means for the introduction of ambient air into said exhaust nozzle.

5. A noise suppression system according to claim 1 wherein said flow mixer has an open center area for the passage of at least some of said engine core flow stream therethrough.

6. A noise suppression system according to claim 1 wherein said flow mixer has a closed center area and wherein all said engine core flow stream is deflected radially outwardly for inversion with said engine fan flow stream.

7. A noise suppression system according to claim 1 wherein said exhaust nozzle is formed, at least in part, by a lobed mixing member having adjacent panel wall portions and including:

wall braces extending between adjacent panel wall portions to dampen resonance vibration of said panel wall portions.

8. A noise suppression system according to claim 1 including:

radially extending struts each having an inner end and an outer end, each strut inner end being affixed to a said exhaust nozzle lobe and each outer end being affixed to an engine structural member.

9. A noise suppression system according to claim 1 wherein said exhaust nozzle lobes have elongated radially extending passageways for the flow of said engine flow streams therethrough and wherein said lobes are configured adjacent exit ends with integral convergent-divergent nozzle portions.

10. A fixed geometry noise suppression system for use with a turbofan engine having at its exhaust end, fan flow and core flow streams which comprises:

a flow mixer having fixed wave-like lobes, the flow mixer being attached to said engine exhaust end and arranged to, at least in part, invert said engine fan flow and core flow streams to provide a flow mixer stream;

an exhaust nozzle having fixed wave-like lobes, the exhaust nozzle being supported by said engine and spaced in overlapping telescopic relationship with said lobed flow mixer, the lobes of said exhaust nozzle being aligned with corresponding lobes of said flow mixer; and an ambient air inlet at a forward end of said exhaust nozzle such that ambient air is mixed by said exhaust nozzle with said flow mixer stream.

11. A noise suppressor as defined in claim 10 including an exhaust shroud supported at least in part aft of said exhaust nozzle and in which said exhaust nozzle has a maximum internal diameter of "D" and wherein an aft end of said ejector shroud extends a distance aft of an aft end of said flow mixer about 1.5 times "D".

* * * * *